June 2, 1942. C. E. ROHN 2,285,094
POWER TRANSMISSION FOR BULLDOZERS
Filed March 7, 1941 3 Sheets-Sheet 2
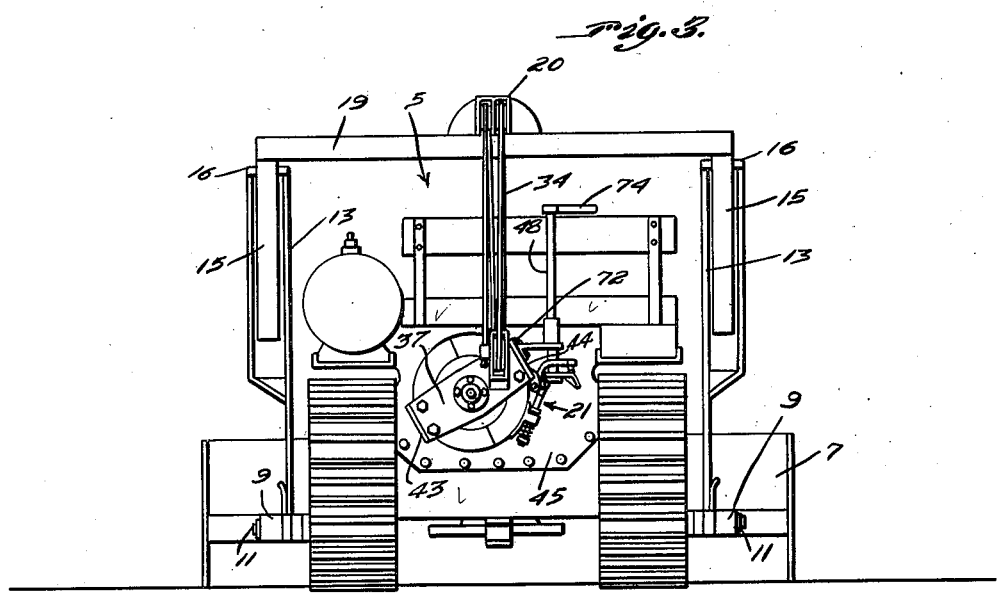
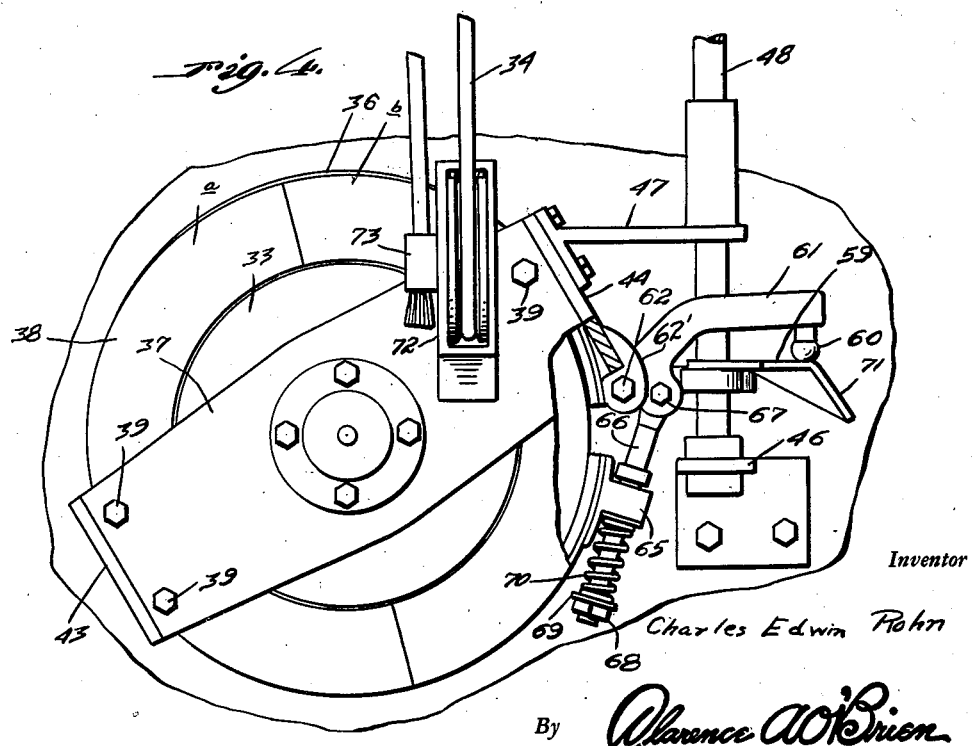
Inventor
Charles Edwin Rohn
By Clarence A. O'Brien
Attorney

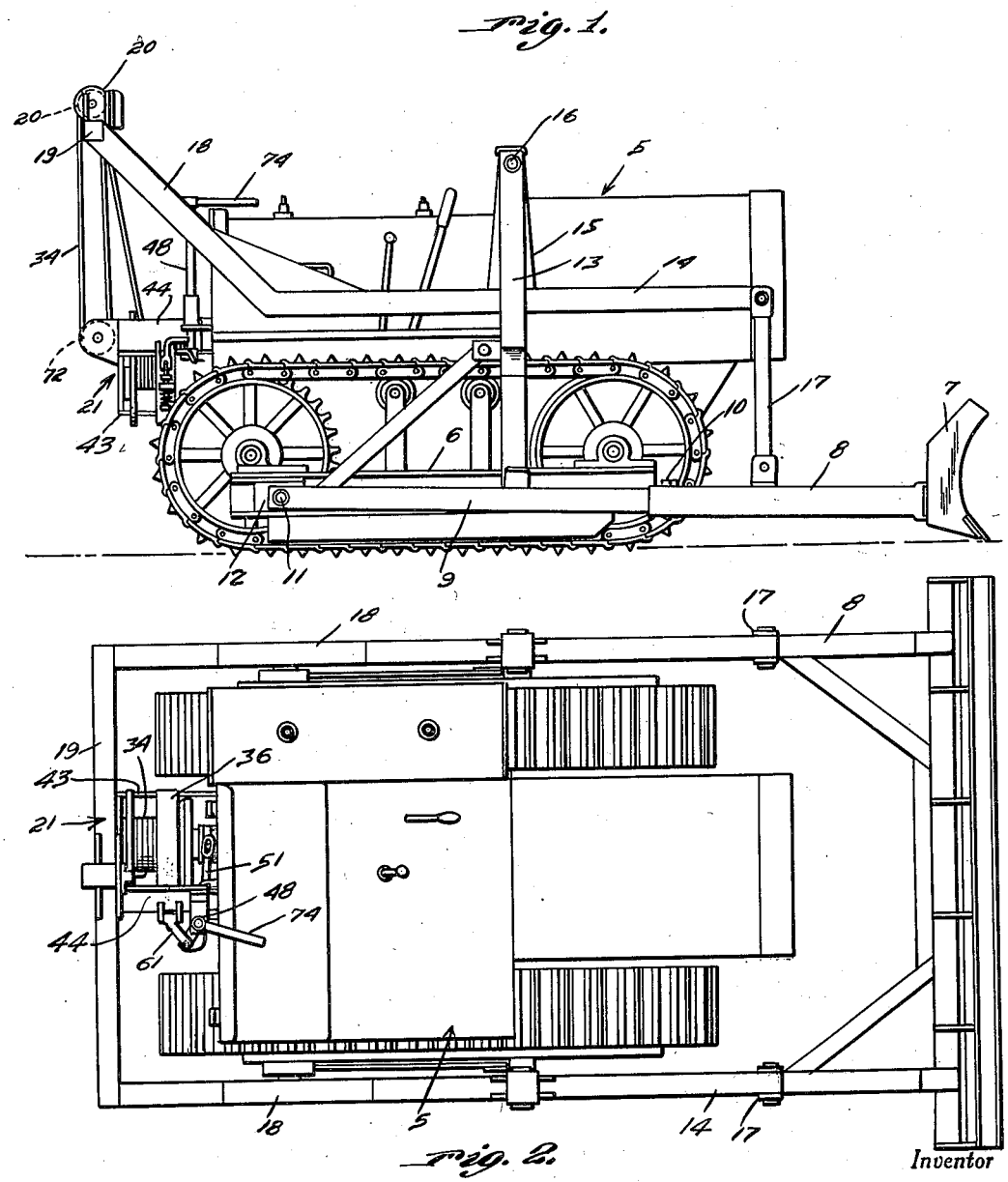

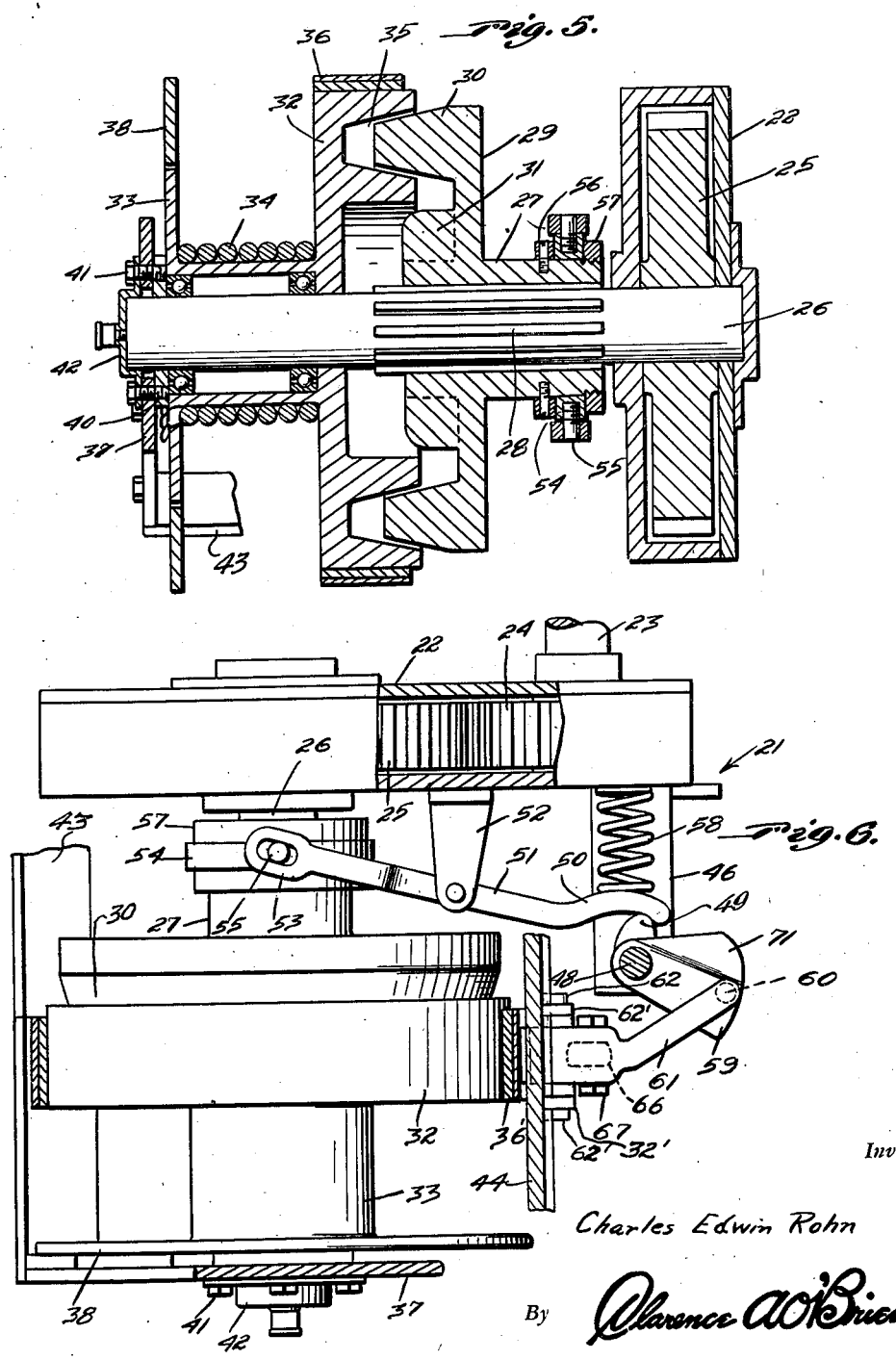

Patented June 2, 1942

2,285,094

UNITED STATES PATENT OFFICE 2,285,094

POWER TRANSMISSION FOR BULLDOZERS

Charles Edwin Rohn, Sacramento, Calif., assignor of ninety per cent to Inez Rohn, Sacramento, Calif.

Application March 7, 1941, Serial No. 382,235

1 Claim. (Cl. 254—187)

This invention appertains to new and useful improvements in power transmission for bulldozers.

The principal object of the present invention is to provide power transmission means, including a specially designed clutch, whereby the conventional bulldozer blade can be lifted and lowered quickly and but with a minimum requirement of skill and effort on the part of the operator.

Another important object of the invention is to provide a power transmission for bulldozers which is of simple construction, yet wherein the parts are positive acting and unsusceptible to the ready development of defects.

These and various other important objects and advantages of the invention will become apparent to the reader of the following description.

In the drawings—

Figure 1 represents a side elevational view of a bulldozer apparatus showing the novel transmission in use.

Figure 2 is a top plan view of the structure shown in Figure 1.

Figure 3 is a rear elevational view of the structure shown in Figure 1.

Figure 4 is an enlarged fragmentary elevational view showing the clutch and associated means shown proportionately smaller in Figure 2.

Figure 5 is a sectional view through the transmission.

Figure 6 is a fragmentary top plan view of the transmission with parts broken away.

Referring to the drawings wherein like numerals designate like parts, it can be seen that the numeral 5 generally refers to a caterpillar type of tractor which has side frame members 6.

Numeral 7 denotes a bulldozer blade provided with rearwardly extending hollow channeled members 8 which telescope arms 9 and are secured thereto as at 10. The arms 9 are pivotally secured as at 11 to blocks 12 on the rear portion of the frame 6.

Rising from each of the side frame members 6 is a post 13. A pair of beams 14, one at each side of the tractor 5 are suspended by legs 15 from fulcrum points 16 on the upper ends of the posts 13 and the forward ends of these beams 14 are connected by bars 17 to hollow members 8.

The rear portions of the beams 14 are inclined as at 18 and bridged by a bar 19, on which is mounted a double pulley block 20. The bridge bar 19 and pulley block 20 are located above the power transmission generally referred to by numeral 21.

This transmission 21 consists of a gear housing 22 having a power shaft 23 from the tractor engine extending into one end thereof and on this end of the shaft 23 and located within the housing 22 is a gear 24 meshing with a second gear 25 also located in the housing 22 and carried by a shaft 26, which extends rearwardly from the housing 22. A hub 27 is splined as at 28 to the intermediate portion of the shaft 26 and this hub 27 carries a clutch annulus 29 having a laterally disposed and tapered circumferential portion 30 and internal fins 31 for guiding the formation 30 properly into the clutch side 32 of a reel 33 on which a cable 34 is wound. The clutch side 32 of the reel 33 has a tapered channel 35 in the side thereof for receiving the tapered formation 30 and on the peripheral portion of this side member 32 is a brake band 36.

A plate 37 is diametrically disposed across the back side of the reel 33 and is secured to a guard annulus 38 by bolts 39, this annulus 38 being divided into a pair of semi-circular sections a—b. Interposed between the plate 37 and the corresponding end of the reel 33 is an abutment plate 40 held in place by bolts 41, the latter also serving to hold a lubricating cap 42 over the corresponding end of the shaft 26. Thus the reel 33 is left free to rotate on the shaft 26 when the clutch formation 30 is disengaged from the clutch side 32 of the reel 33.

Plates 43, 44 extend from the ends of the plate 37 to connect to the crankcase 45 of the tractor 5.

As shown in Figure 6, common operating means is provided for shifting the clutch collar 27 and operating the brake band 36 simultaneously. In this connection, a bracket 46 extends rearwardly from the gear case 22 and a second bracket 47 extends obliquely in a forwardly direction from the plate 44. A control shaft 48 extends vertically through the brackets 46 and 47 and carries a cam 49 which operates against the curved end 50 of a rocker 51 which is rockably supported by a bracket 52 projecting forwardly from the gear case 22. The other end of the rocker 51 is provided with a fork having slotted ends 53 straddling a ring 54 and receiving pins 55 projecting from said ring. The ring 54 is located between a pair of collars 56 and 57 located on the hub 27. A compression spring 58 is interposed between the gear case 22 and the curved end 50 of the rocker 51 for the purpose of urging this end of the rocker toward the cam 49 and maintaining the clutch formation 30 disengaged from the reel side 32.

Also carried by the vertical control shaft 48 is a laterally disposed plate 59 on which rides a headed pin 60 depending from a lever 61 fulcrumed as by bolt 62 to ears 62' on plate 44. One end of the band 36 is provided with a lug 65 apertured to receive a pin 66, one end of which is pivotally secured as at 67 to the lever 61, while its other end is threaded to accommodate a nut 68 against which abuts a washer 69. The other end of the band 32 is suitably anchored by bolt 62 to plate 44 through ears 62' on said band. Interposed between the washer 69 and the lug 65 is a coiled compression spring 70. Obviously, the fact that the spring 70 can be controlled by regulating the nut 68 on the pin 66.

As clearly shown in Figure 4, the plate 59 has an inclined portion 71 on which the headed pin 60 can ride as well as on the plate 59.

As is apparent in Figures 1 and 3, a pulley 72 is secured to the cross plate 37. The cable 34 has one end anchored as at 73 (see Figure 4) to one side of the pulley block 72. From this anchored point the cable extends upwardly over one pulley of the block 20, then downwardly and under the pulley of the block 72 and then upwardly over the remaining pulley of the block 20 and then downwardly to wind on the drum 33.

In the operation of the machine, the operator stands or has a seat on the rear portion of the bulldozer and by operating the shaft 48 through the medium of a handle 74, he can actuate the cam 49 to swing the rocker 51 in a manner to cause engagement of the clutch formation 30 with the clutch side portion 32 of the reel 33, to the end that power will be transmitted to the reel 33 and the bulldozer blade 7 lifted to the desired point and by a very slight movement of the handle 74, the clutch members can be caused to slip. In other words, there is a slight play between positioning of the handle 74 for operating the clutch member 39 and the position for operating the brake band 36 so that a slight playing back and forth of the handle 74 will result in a gradual lifting or lowering of the bulldozer blade to the desired extent.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In an apparatus of the class described, a driven reel shaft, a reel freely rotatable on the reel shaft and embodying a driven clutch member forming a brake drum, a driving clutch member splined on the driven shaft for shifting into and from engagement with the driven clutch member, a brake band trained around said drum and having opposed fixed and movable ends the movable end for drawing toward the fixed end to tighten the band against said drum, and means to shift said driven clutch member into engagement and tighten said band comprising a manually operative control shaft rotatably mounted, a cam on said control shaft, a pivoted clutch shifting lever having one end operatively connected to said driving clutch member to shift the same and a curved cam on its other end engaging said first cam, a cam plate fast on said control shaft and having a flat face and an adjoining inclined face, a band tightening arm pivotally mounted adjacent the fixed end of the band and operatively connected to the movable end thereof, said arm extending across said plate, and a ball mounted on said arm and riding on the plate.

CHARLES EDWIN ROHN.